United States Patent
Wong et al.

(10) Patent No.: US 8,805,566 B2
(45) Date of Patent: Aug. 12, 2014

(54) PRODUCT LINE MANAGEMENT SYSTEM AND METHOD THEREOF

(75) Inventors: Shih-Fang Wong, Tu-Cheng (TW); Xin Lu, Shenzhen (CN); Fei Wang, Shenzhen (CN); Peng Tang, Shenzhen (CN); Jia-Hong Yang, Shenzhen (CN); Hui-Feng Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 685 days.

(21) Appl. No.: 13/040,235

(22) Filed: Mar. 3, 2011

(65) Prior Publication Data
US 2012/0173010 A1    Jul. 5, 2012

(30) Foreign Application Priority Data
Dec. 29, 2010   (CN) .......................... 2010 1 0612801

(51) Int. Cl.
*G06F 19/00*   (2011.01)
(52) U.S. Cl.
USPC .............. 700/116; 700/32; 700/108; 702/81; 702/84

(58) Field of Classification Search
USPC ......... 700/27, 32, 108, 109, 115, 117; 702/84
See application file for complete search history.

(56) References Cited

U.S. PATENT DOCUMENTS

| | | |
|---|---|---|
| 2006/0004475 A1* | 1/2006 | Brackett et al. ............... 700/108 |
| 2012/0078410 A1* | 3/2012 | Wong et al. ................... 700/110 |

* cited by examiner

*Primary Examiner* — Mohammad Ali
*Assistant Examiner* — Sheela S Rao
(74) *Attorney, Agent, or Firm* — Novak Druce Connolly Bove + Quigg LLP

(57) ABSTRACT

A method testing the quality of products applied to a system is provided. Each product includes a unique identification number. The system includes a data storage device and test devices. The data storage device includes a first table recording identification numbers, test types, and test results, each test device stores a second table records the identification numbers and the test types. The method includes: obtaining the identification number; obtaining the test type; determining whether a test type previous to the test type exists; and generating first information to prompt the operator to return the to-be-tested product to the workstation of previous test type when the test result corresponding to the existed previous test type does not exist or the test result corresponding to the existed previous test type is a first value.

11 Claims, 3 Drawing Sheets

PRODUCT LINE MANAGEMENT SYSTEM AND METHOD THEREOF

BACKGROUND

1. Technical Field

The present disclosure relates to product line management systems and, particularly, to a product line management system capable of improving quality of products and a method thereof.

2. Description of Related Art

When manufacturing products, a number of test types are applied to test the products to ensure the quality. Because the test types may be applied in different workstations, and even may be in different workshops, some of the products may be missed on some quality test types, which may not insure quality to the products.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure are now described in detail, with reference to the accompanying drawings.

Figure 1:
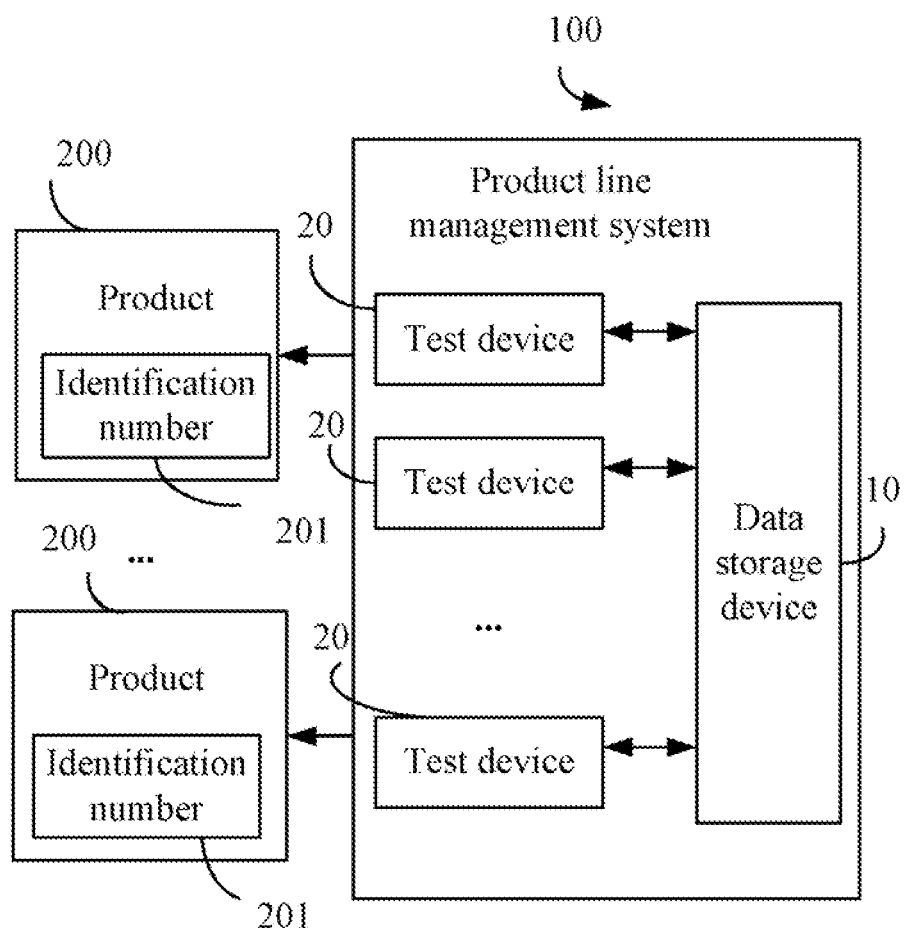
FIG. 1 is a block diagram of a product line management system in accordance with an exemplary embodiment.
Figure 2:
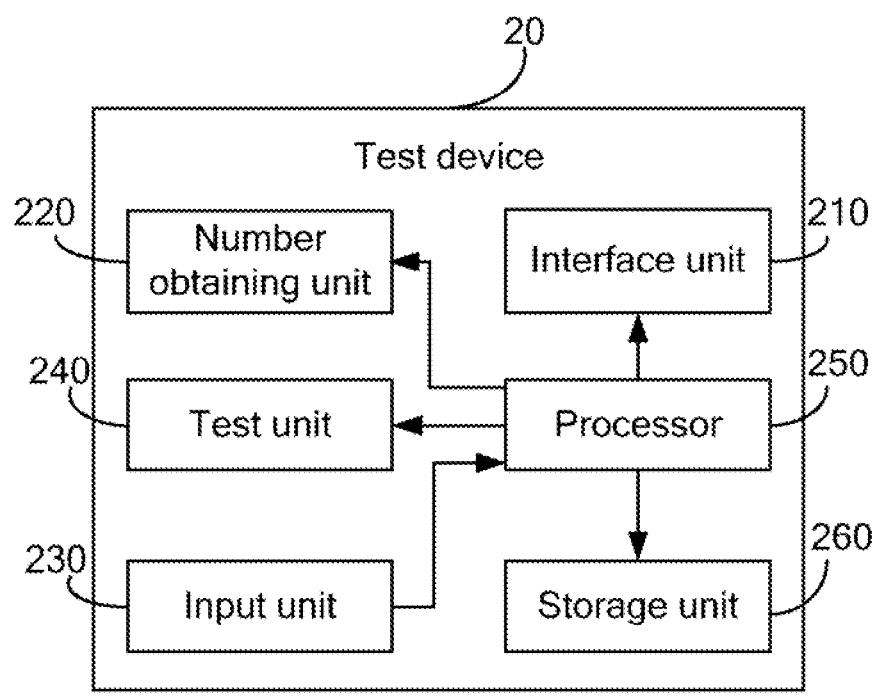
FIG. 2 is a block diagram of a test device in the product line management system of FIG. 1, in accordance with an exemplary embodiment.

Referring to FIGS. 1-2, a product line management system 100 is configured to manage the products 200 of product lines. The products 200 are tested by different test types at different workstations, each product 200 includes an individual identification number 201. In the embodiment, the identification number 201 is a bar code adhering to each product 200. The product line management system 100 includes a data storage device 10 and a number of test devices 20. Each test device 20 includes an interface unit 210, a number obtaining unit 220, an input unit 230, a test unit 240, a processor 250, and a storage unit 260. In the embodiment, each workstation has one test device 20. The interface unit 210 may be a USB unit. The data storage device 10 can be connected to the test device 20 through the interface unit 210.

The data storage device 10 stores a first table as shown below. The first column of the first table records the identification numbers 201 of the products 200. The second column of the first table records the test types. The third column of the first table records the test results corresponding to the test types. The fourth column of the first table records the test times corresponding to the test types. Each identification number 201 corresponds to a number of the test types, test times, and test results. Each test type corresponds to one test result and one test time. In the embodiment, the data storage device 10 is a data storage server.

| The first table | | | |
|---|---|---|---|
| Identification number | Test item | Test result | Test time |
| 20101008521369 | Audio test | a first value | 2011.01.05 11:00 |
| ... | ... | ... | ... |
| 20101054861531 | Switch test | a second value | 2010.12.26 10:23 |
| ... | ... | ... | ... |

The number obtaining unit 220 is to obtain the identification number 201 of one to-be-tested product 200. In the embodiment, the number obtaining unit 220 is an optical scanner.

The test unit 240 tests the to-be-tested product 200 according to an operator's selected test type and the obtained identification number 201. In this embodiment, the operator selects one test type through the input unit 230. In other embodiment, the operator inputs one test type through the input unit 230.

The storage unit 260 stores a second table as shown below. The second table includes a first column recording the identification numbers 201 and a second column recording the test types. Each identification number 201 corresponds to a number of test types. The test types corresponding to each identification number 201 are arranged according to a test order. The test type before the remaining test types needs to be tested first.

| The second table | |
|---|---|
| Identification number | Test item |
| 20101008521369 | Audio test |
| | ... |
| | Switch test |
| 20101054861531 | Screen test |
| | ... |
| | Sensor test |

The processor 250 obtains the selected test type and determines whether a test type previous to the selected test type (hereinafter, previous test item) exists according to the obtained identification number 201 and the second table. If the previous test type exists, the processor 250 further searches in the first table to determine whether a test result corresponding to the previous test type exists according to the obtained identification number 201. If the test result does not exist, the processor 250 generates first information to prompt the operator to return the to-be tested product 200 to the workstation of the previous test type. If the test result exists, the processor 250 determines whether the test result is a first value, for example, "not OK", namely the to-be-tested product 200 has a malfunction corresponding to the test type. If the test result is "not OK", the processor 250 still generates the first information. If the test result is a second value, for example, "OK", a function of the to-be-tested product 200 corresponding to the test type is OK, the processor 250 generates second information to prompt the operator to operate the test unit 240 to test the function of the product 200 corresponding to the selected test type and record the test time. If there is no previous test type, the processor 250 still generates the second information.

The processor 250 further updates the first table according to the identification number 201, the current test type, the current test time, and the current test result.

Figure 3:
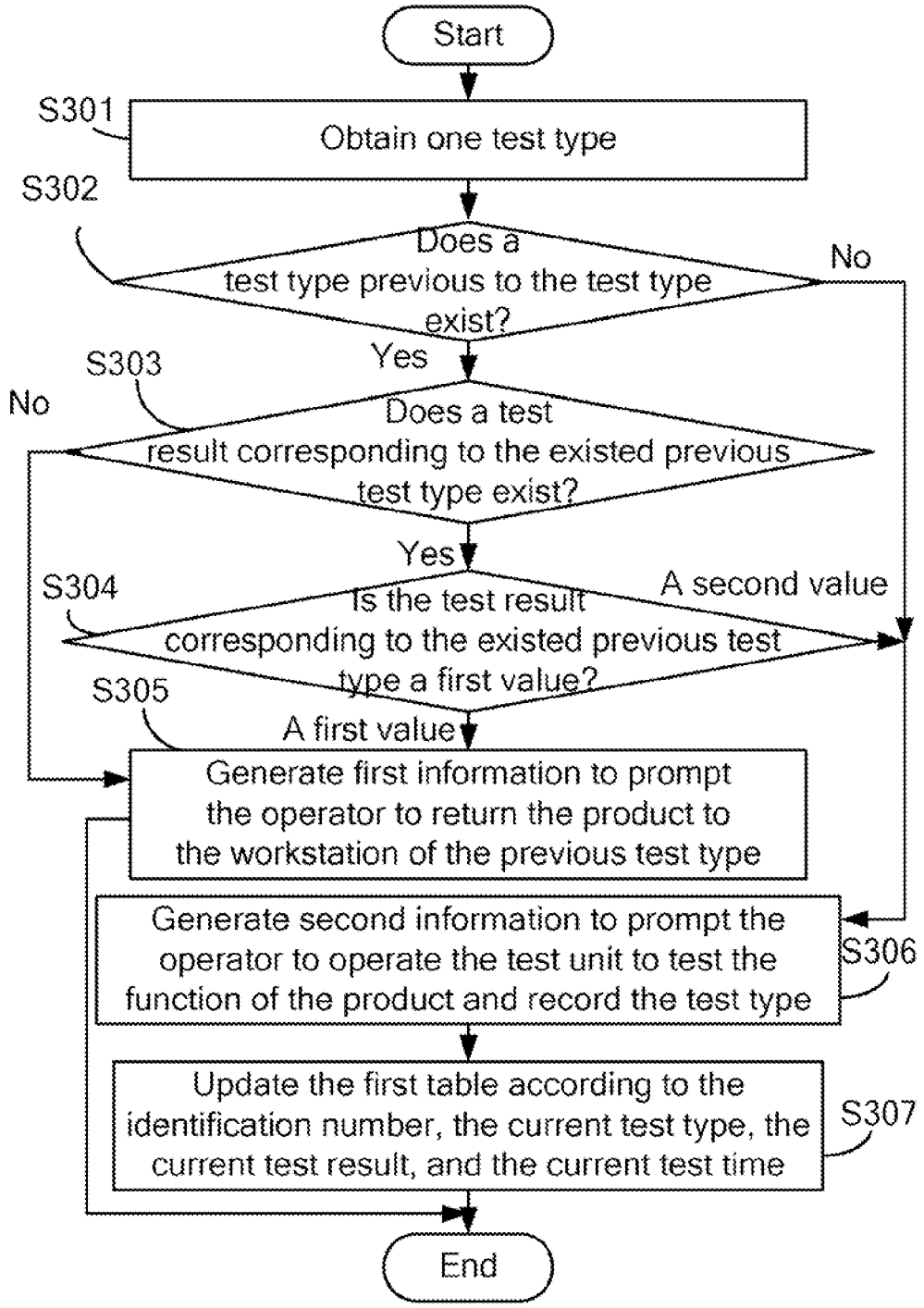
FIG. 3 is a flowchart of a product line management method in accordance with an exemplary embodiment.

Referring to FIG. 3, a product line management method in accordance with an exemplary embodiment is shown.

In step S301, the processor 250 obtains the selected test type.

In step S302, the processor 250 determines whether a previous test type corresponding to the current test type exists according to the identification number 201 and the second table. If a previous test type exists, the procedure goes to step S303. If a previous test type does not exist, the procedure goes to step S306.

In step S303, the processor 250 searches in the first table to determine whether a test result corresponding to the previous test type exists according to the obtained identification number 201. If a test result exists, the procedure goes to S304. If a test result does not exist, the procedure goes to S305.

In step S304, the processor 250 determines whether the test result is a first value. If the test result is a first value, the procedure goes to S305. If the test result is a second value, the procedure goes to S306.

In step S305, the processor 250 generates first information to prompt the operator to return the to-be-tested product 200 to the workstation of the previous test item.

In step S306, the processor 250 generates second information to prompt the operator to operate the test unit 240 to test the function of the product 200 corresponding to the selected test type and records the test time.

In step S307, the processor 250 updates the first table according to the identification number 201, the current test type, the current test time, and the current test result.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A product line management system for testing products, each of the products comprising a unique identification number, the product line management system comprising:
   a data storage device to store a first table, the first table comprising a first column recording the unique identification numbers of the products, a second column recording test types, and a third column recording test results, each of the identification numbers corresponding to a plurality of the test types and a plurality of the test results, one of the test types corresponding to one of the test results; and
   a plurality of test devices, each of the test devices comprising:
      a number obtaining unit to obtain the individual identification number of one to-be-tested product;
      an input unit;
      a storage unit to store a second table comprising a first column recording the identification numbers and a second column recording the test types, each of the identification numbers corresponding to a plurality of the test types, the test types corresponding to one of the identification numbers being arranged in a test order;
      an interface unit to connect the data storage device to the test device; and
      a processor to obtain the test type through the input unit, determine whether a test type previous to the input current test type exists in the second table, and further generate first information to prompt the operator to return the to-be-tested product to the workstation of the existed previous test type when the test result corresponding to the existed previous test type searched in the first table through the interface unit does not exist or the test result corresponding to the previous test type is a first value.

2. The product line management system as described in claim 1, further comprising a test unit to test the to-be-tested product according to the input test type and the identification number, wherein the processor is to generate second information to prompt the operator to operate the test unit to test the function of the product when the test result corresponding to the identification number and the previous test type of the products is a second value.

3. The product line management system as described in claim 1, further comprising a test unit to test the to-be-tested product according to the input test type and the identification number, wherein the processor generates the second information to prompt the operator to operate the test unit to test the function of the to-be-tested product when a test type previous to the input current test type does not exist.

4. The product line management system as described in claim 1, wherein the first table stored in the data storage device further comprising a fourth column recording the test times, each of the identification numbers corresponds to a plurality of test times, and each of the test types corresponds to one of the test times.

5. The product line management system as described in claim 1, wherein the processor updates the first table through the interface unit according to the identification number, the current test item, the current test time, and the current test result.

6. A product line management method applied to a product line management system, the product line management system configured to manage to-be-tested products of the product line, each of the products comprising a unique identification number, the product line management system comprising a data storage device and a plurality of test devices, the data storage device comprising a first table, the first table comprising a first column recording identification number, a second column recording test types, and a third column recording test results, each of the identification numbers corresponding to a plurality of test types and test results, each of the test types corresponding to one of the test results, each of the test devices storing a second table, a first column of the second table recording the identification numbers and a second column of the second table recording the test types, each of the identification number corresponding to a plurality of test types, the test types corresponding to each of the identification numbers being arranged in a test order, wherein the method comprising:
   obtaining the identification numbers of the products;
   obtaining the test type;
   determining whether a test type previous to the current test type exists; and
   generating first information to prompt the operator to return the to-be-tested product to the workstation of existed previous test type when the test result of the product corresponding to the existed previous test type searched in the second table does not exist or the test result of the product corresponding to the existed previous test type is a first value.

7. The product line management method as described in claim 6, the test device comprising a test unit, wherein the method further comprises:
   generating second information to prompt the operator to operate the test unit to test the function of the product corresponding to the test type when the test result of the product corresponding to the existed previous test type is a second value.

8. The product line management method as described in claim 6, the test device comprising a test unit, wherein the method further comprises:

generating second information to prompt the operator to operate the test unit to test the function of the product when the existed previous test type corresponding to the current test type does not exist.

9. The product line management method as described in claim 6, wherein the method further comprises:

updating the first table according to the identification number, the current test type, and the current test result.

10. The product line management method as described in claim 6, wherein the first table further comprises a fourth column recording the test times, each of the identification numbers corresponds to a plurality of test times, each of the test types corresponds to one of the test times.

11. The product line management method as described in claim 10, wherein the method further comprises:

updating the first table according to the identification number, the current test type, the current test result, the current test time.

* * * * *